United States Patent
Abdolkhani et al.

(10) Patent No.: US 10,269,486 B2
(45) Date of Patent: Apr. 23, 2019

(54) MAGNETICALLY PERMEABLE CORE AND INDUCTIVE POWER TRANSFER COIL ARRANGEMENT

(71) Applicant: Apple Inc., Cupertino, CA (US)

(72) Inventors: Ali Abdolkhani, Auckland (NZ); Aiguo Hu, Auckland (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/312,375

(22) PCT Filed: May 14, 2015

(86) PCT No.: PCT/NZ2015/050055
§ 371 (c)(1),
(2) Date: Nov. 18, 2016

(87) PCT Pub. No.: WO2015/178780
PCT Pub. Date: Nov. 26, 2015

(65) Prior Publication Data
US 2017/0084388 A1    Mar. 23, 2017

Related U.S. Application Data

(60) Provisional application No. 62/000,232, filed on May 19, 2014.

(51) Int. Cl.
H01F 27/24    (2006.01)
H01F 38/14    (2006.01)
(Continued)

(52) U.S. Cl.
CPC ............... H01F 38/14 (2013.01); H01F 3/10 (2013.01); H01F 27/24 (2013.01);
(Continued)

(58) Field of Classification Search
CPC .......... H01F 27/00–27/36; H01F 21/00–21/06
(Continued)

(56) References Cited

U.S. PATENT DOCUMENTS 5,000,178 A    3/1991    Griffith
5,469,036 A    11/1995    Eto
(Continued)

FOREIGN PATENT DOCUMENTS

CN    101461114    6/2009
JP    60-254400 A    12/1985
(Continued)

OTHER PUBLICATIONS

Abdolkhani A. et al., "A Novel Detached Magnetic Coupling Structure for Contactless Power Transfer", IECON/ICELIE, 1103-1108 (2011).

(Continued)

Primary Examiner — Tuyen Nguyen

(57) ABSTRACT

An inductive power transfer coil arrangement comprising: a first coil assembly including: at least a first magnetically permeable core including a base having first and second limbs extending away therefrom, wherein the first limb is located between two second limbs and extends further from the base than the second limbs, and at least one coil wound about at least one limb; and a second coil assembly including: at least a second magnetically permeable core for use in an inductive power transfer system, including a base having first and second limbs extending away therefrom, wherein the first limb is located between two second limbs that extend further from the base than the second limbs; and at least one coil wound about at least one limb; the first and second magnetically permeable cores being arranged in relatively moveable relationship such that in some relative
(Continued)

positions the first and second magnetically permeable cores are opposed such as to provide effective magnetic coupling.

16 Claims, 5 Drawing Sheets

(51) Int. Cl.
*H01F 3/10* (2006.01)
*H02J 50/10* (2016.01)
*H01F 27/28* (2006.01)
*H01F 38/18* (2006.01)

(52) U.S. Cl.
CPC ......... *H01F 27/2823* (2013.01); *H01F 38/18* (2013.01); *H02J 50/10* (2016.02)

(58) Field of Classification Search
USPC .............................. 336/130–136, 232–234
See application file for complete search history.

(56) References Cited

U.S. PATENT DOCUMENTS

| | | | |
|---|---|---|---|
| 7,197,113 | B1 | 3/2007 | Katcha et al. |
| 7,880,337 | B2 | 2/2011 | Farkas |
| 8,228,010 | B2 * | 7/2012 | Zadeh ................. H01F 38/18 318/115 |
| 8,824,624 | B2 * | 9/2014 | Loef .................. A61B 6/56 378/15 |
| 9,064,632 | B2 * | 6/2015 | Loiselle ............. H01F 38/18 |
| 2005/0068019 | A1 | 3/2005 | Nakamura et al. |
| 2007/0064406 | A1 | 3/2007 | Beart |
| 2010/0109604 | A1 | 5/2010 | Boys et al. |
| 2010/0259217 | A1 | 10/2010 | Baarman et al. |
| 2012/0188041 | A1 | 7/2012 | Kook |
| 2013/0030892 | A1 | 1/2013 | Liu et al. |
| 2013/0119773 | A1 | 5/2013 | Davis |
| 2014/0091755 | A1 | 4/2014 | Walley et al. |
| 2014/0197687 | A1 | 7/2014 | Lin |

FOREIGN PATENT DOCUMENTS

| | | |
|---|---|---|
| JP | H06277358 | 10/1994 |
| JP | 2001044054 | 2/2001 |
| JP | 2001196249 A | 7/2001 |
| JP | 2002246248 | 8/2002 |
| JP | 2005302959 A | 10/2005 |
| JP | 06-029128 A | 2/2006 |
| JP | 2006042519 | 2/2006 |
| JP | 06-105471 A | 4/2006 |
| JP | 2006128381 | 5/2006 |
| JP | 2006245363 A | 9/2006 |
| JP | 2007505480 | 3/2007 |
| JP | 2009088479 A | 4/2009 |
| JP | 2011229360 | 11/2011 |
| JP | 2012119496 A | 6/2012 |
| JP | 2012120328 A | 6/2012 |
| JP | 2013534040 A | 8/2013 |
| KR | 100944113 | 2/2010 |
| KR | 1020100017582 | 2/2010 |
| WO | 2003105308 | 12/2003 |
| WO | 2005024865 | 3/2005 |
| WO | 2007126321 | 11/2007 |
| WO | 2008137996 A1 | 11/2008 |
| WO | 2008140333 | 11/2008 |
| WO | 2010090538 | 8/2010 |
| WO | 2010090539 | 8/2010 |
| WO | 2011016736 | 2/2011 |
| WO | 2011016737 | 2/2011 |
| WO | 2012073427 A1 | 6/2012 |
| WO | 2013036146 A1 | 3/2013 |
| WO | 2013122483 A1 | 8/2013 |
| WO | 2013/186180 A1 | 12/2013 |
| WO | 2014083015 A1 | 6/2014 |

OTHER PUBLICATIONS

Abdolkhani, A. et al., "A Sandwiched Magnetic Coupling Structure for Contactless Slipring Applications", International Geoinformatics Research and Development, 2(3): 1-9 (2011).

Abdolkhani, A. et al., "Face to Face Through-hole Contactless Slipring System for Rotary Applications", IJAREEIE, 2(9): 4277-4286 (2013).

Abdolkhani, A. et al., "Modelling and Parameters Identification of Through-Hole Type Wind Turbine Contactless Sliprings", SCIRP/Engineering, 4: 272-283 (2012).

Esser, A. et al., "A New Approach to Power Supplies for Robots", IEEE Transactions on Industry Applications, 27(5): 372-875 (1991).

Kacprzak, D. "A Novel S-Pickup for High Power Inductive Power Transfer Systems", Magnetics Conference, INTERMAG, 1 pg. (2006).

Kacprzak, D. et al., "An Improved Magnetic Design for Inductively Coupled Power Transfer System Pickups", Power Engineering Conference, IPEC, 1133-1136 (2005).

Legranger, J. et al., "Comparison of Two Optimal Rotary Transformer Designs for Highly Constrained Applications", Electric Machines & Drives Conference, IEMDC, 1546-1551 (2007).

Moradewicz, A.J. et al., "High efficiency contactless energy transfer system with power electronic resonant converter", Technical Sciences, 57(4): 375-381 (2009).

Muljadi, E. et al., "Pitch-Controlled Variable-Speed Wind Turbine Generation", Industry Applications Conference, 34th IAS Annual Meeting, Conference Record of the 1999 IEEE, 1: 323-330 (1999).

Papastergiou, K. et al., "An Airborne Radar Power Supply With Contactless Transfer of Energy—Part I: Rotating Transformer", IEEE Transactions on Industrial Electronics, 54(5): 2874-2884 (2007).

Papastergiou, K. et al., "Contact-less Transfer of Energy by means of a Rotating Transformer", IEEE ISIE, 1735-1740 (2005).

Potter, B.A. et al., "Design, Implementation and Characterisation of a Contactless Power Transfer System for Rotating Applications", IEEE, 2168-2173 (2006).

Spackman, D. et al., "Magnetic Interference in Multi-Pickup Monorail Inductively Coupled Power Transfer Systems", Journal of the Japan Society of Applied Electromagnetics and Mechanics, 15(3): 238-241 (2007).

Zaheer, A. et al., "A Bipolar Pad in a 10 kHz, 300W Distributed IPT System for AGV applications", IEEE Transactions Industrial Electronics, pp. 1-14 (2013).

International Search Report for International Patent Application No. PCT/NZ2015/050055 dated Aug. 17, 2015, 4 pgs.

European Search Report for EP Application No. 15796900.7 dated Nov. 5, 2017 (8 pages).

Budhia, et al., "Develpoment of a Single-Sided Flux Magnetic Coupler for Electric Vehicle IPT Charging Systems", IEEE Transactions on Industrial Electronics, vol. 60, No. 1, Jan. 1, 2013 (Jan. 1, 2013), pp. 318-328, XP002781664, DOI: 10.1109/TIE.2011.2179274, p. 325.

Bosshard et al., "Comprehensive Evaluation of Rectangular and Double-D Coil Geometry for 50 kw/85 kHz IPT System" IEEE Journal of Emerging and Selected Topics on Power Electronics (JESTPS), vol. 4, No. 4, Dec. 31, 2016 (Dec. 31, 2016), pp. 1406-1415, XP002781665, DOIL 10-1109/JESTPE.2016.2600162, p. 1408.

\* cited by examiner

MAGNETICALLY PERMEABLE CORE AND INDUCTIVE POWER TRANSFER COIL ARRANGEMENT

This application is a National Stage Application of PCT/NZ2015/050055, filed 14 May 2015, which claims benefit of U.S. Provisional Patent Application Ser. No. 62/000,232, filed 19 May 2014 and which applications are incorporated herein by reference. To the extent appropriate, a claim of priority is made to each of the above disclosed applications.

FIELD OF THE INVENTION

The present invention is in the field of wireless power transfer systems. More particularly, the invention relates to magnetically permeable cores incorporated into transmitters and receivers in wireless power transfer systems and coil arrangements utilising the cores.

BACKGROUND OF THE INVENTION

Mechanical slip rings utilising direct contact electrical connections are still utilised in a large number of applications. These suffer from contact losses, contact failure and high maintenance costs.

Inductive Power transfer (IPT) systems have been developed which address these drawbacks. A basic problem that must be overcome in wireless power transfer system design is ensuring that power can be transferred between coil arrangements over sufficient displacements (i.e. between the primary side and the secondary side), while maintaining sufficient power transfer.

Introducing magnetically permeable elements into either the transmitting coils or receiving coils can improve the performance of the system. Magnetically permeable elements increase the inductance of the transmitter or receiver coils. This means that less coil turns are required to achieve the same inductance value as a transmitter or receiver without magnetically permeable elements. Magnetically permeable elements can also be configured to 'shape' the magnetic field, which can be directed from the transmitter to the receiver. By directing the magnetic field, the coupling factor between the transmitter and receiver can be increased, thus improving the performance of the system.

Current IPT coil arrangements often suffer from a low magnetic coupling coefficient k, which results in limited power transfer capability, particularly for large air gaps, due to magnetic flux leakage between the limbs of the magnetically permeable cores. Decreased power transfer capability results in low efficiency, greater size and greater cost for a given power transfer capacity.

The physical space available for a wireless power transfer system is often limited, including in rotary applications for robotic joints and wind power pitch control. Further, a large air gap is often required for mechanical clearance. When the air gap is large, the magnetic flux tends to leak within the core limbs instead of linking to the other side, which can result in low magnetic field coupling.

It is an object of the invention to provide a magnetically permeable core and an inductive power transfer coil arrangement having improved magnetic coupling, or to at least provide the public with a useful choice.

SUMMARY OF THE INVENTION

According to one exemplary embodiment there is provided an inductive power transfer coil arrangement comprising:

i. a first coil assembly including:
  a. at least a first magnetically permeable core including a base having first and second limbs extending away therefrom, wherein the first limb is located between two second limbs and extends further from the base than the second limbs, and
  b. at least one coil wound about at least one limb; and
ii. a second coil assembly including:
  a. at least a second magnetically permeable core for use in an inductive power transfer system, including a base having first and second limbs extending away therefrom, wherein the first limb is located between two second limbs that extend further from the base than the second limbs; and
  b. at least one coil wound about at least one limb, the first and second magnetically permeable cores arranged in relatively moveable relationship such that in some relative positions the first and second magnetically permeable cores are opposed such as to provide effective magnetic coupling According to another exemplary embodiment there is provided a magnetically permeable core for use in an inductive power transfer system, including a base having one or more first and two or more second limbs arranged along annular paths extending away from the base, wherein the one or more first limb is located between second annular limbs that extend further from the base than the second limbs.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
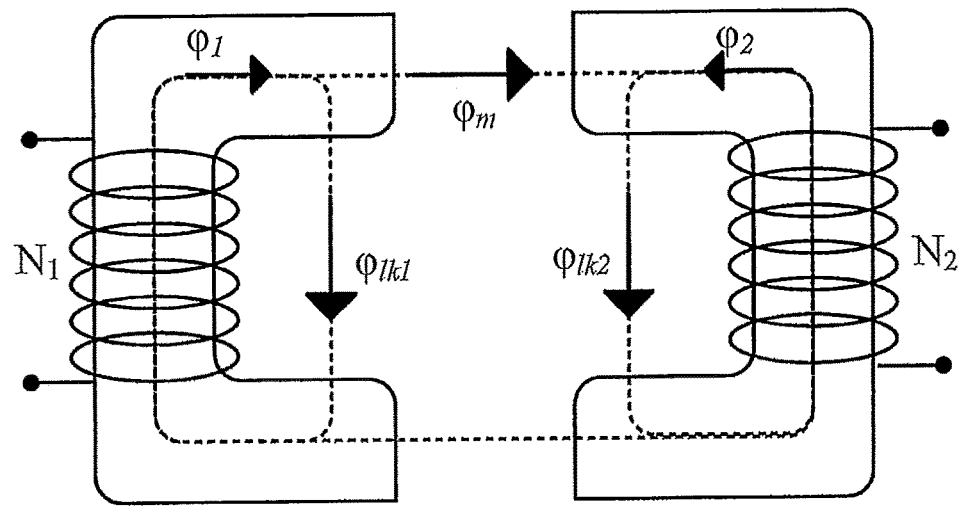
FIG. 1 shows the magnetic flux paths for two standard U cores.

FIG. 1 shows the flux paths of a contactless slip ring system using a UU core arrangement. Note that in the case of EE arrangements, the center-leg flux is divided into two equal portions through the outer legs encircling the coils. Thus because of this symmetry, the whole EE structure can be divided into two identical UU layouts, so only the UU configuration is presented here for theoretical description.

Figure 2:
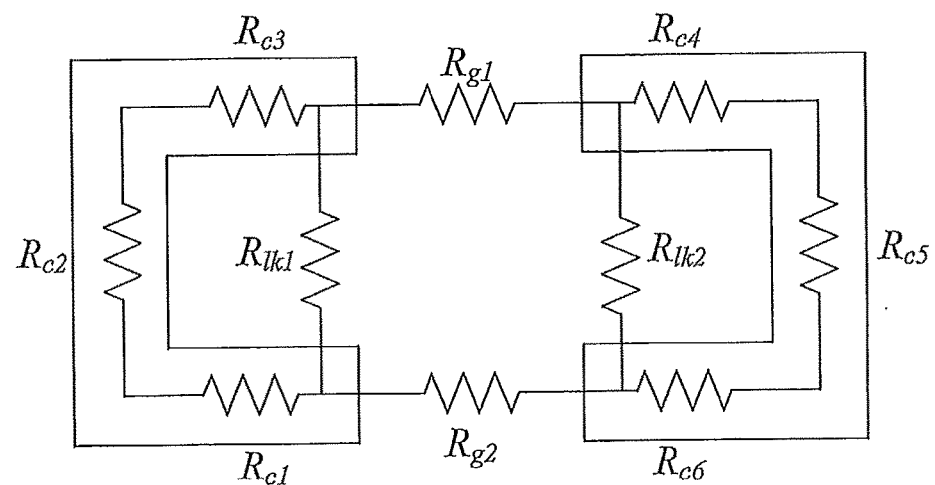
FIG. 2 shows a reluctance model of the arrangement shown in FIG. 1.

In FIG. 1 the total flux linked by each coil can be divided into two components; a mutual component $\varphi_m$ that is common to both coils and leakage flux components ($\varphi_{lk1}$ and $\varphi_{lk2}$) that links only the coil itself. When a magnetic force (Ampere-Turns) is applied to a magnetic element (such as a section of the core, or an air gap), the amount of flux is determined by the reluctance of that magnetic element. The reluctance of each region of the structure is calculated from its area, length and permeability ($\mathcal{R}=l/\mu A$), and inserted with its specific value into the appropriate location in the reluctance models as shown in FIG. 2.

The reluctances of the regions between the cores limbs ($\mathcal{R}_{lk1}$ and $\mathcal{R}_{lk2}$) are of key importance, the magnetic fields in these regions translate into leakage inductance. Relative permeability equals 1.0 in these non-magnetic regions and in the copper conductors. The primary and secondary leakage inductances can be expressed in terms of their relevant reluctances as:

$$L_{lk1} = \frac{N_1^2}{R_{lk1}} = \frac{N_1^2 \mu_0 A_{lk1}}{l_{lk1}} \qquad \text{Equation (1)}$$

$$L_{lk2} = \frac{N_2^2}{R_{lk2}} = \frac{N_2^2 \mu_0 A_{lk2}}{l_{lk2}} \qquad \text{Equation (2)}$$

where $A_{lk1}$ and $A_{lk2}$ are the cross-section areas of the leakage flux lines and $l_{lk1}$ and $l_{lk2}$ are the length of the leakage flux lines path which is the distance between the core limbs.

The mutual inductance on the other hand depends on both coils and can be expressed by:

$$M = \frac{N_1 N_2}{R_m}. \qquad \text{Equation (3)}$$

where $\mathcal{R}_m$ is the total mutual reluctance between two sides expressed by:

$$R_m = R_{c1} + R_{c2} + R_{c3} + R_{c4} + R_{c5} + R_{c6} + R_{g1} + R_{g2} \approx R_{g1} + R_{g2} \qquad \text{Equation (4)}$$

Generally, the air gap reluctances are much greater than the adjacent ferrite core legs in FIG. 2, meaning that the core reluctances could be eliminated from Equation (4). Thus for a total air gap $l_g = l_{g1} + l_{g2}$, the mutual inductance is:

$$M = N_1 N_2 / R_m = N_1 N_2 \mu_0 A_g / l_g \qquad \text{Equation (5)}$$

Figure 3:
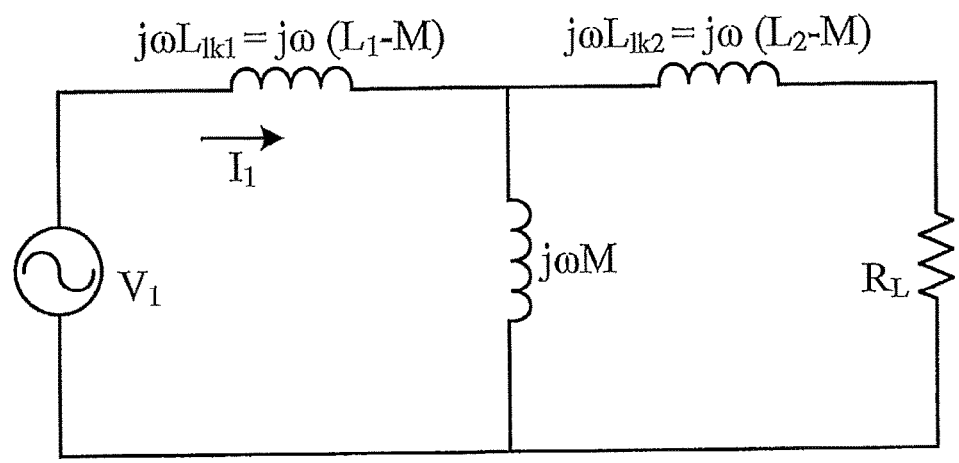
FIG. 3 shows an inductance based T-equivalent circuit of the arrangement shown in FIG. 1.

The reluctance models finally translate to the inductance-based electrical model based on the duality principle as shown in FIG. 3. From FIG. 3 the magnetic coupling coefficient k is calculated based on the system inductances from:

$$k = \sqrt{\frac{M}{L_1} \cdot \frac{M}{L_2}} = \sqrt{\frac{M}{(L_{lk1}+M)} \cdot \frac{M}{(L_{lk2}+M)}} \qquad \text{Equation (6)}$$

Substituting Equations (1), (2) and (5) into Equation (6) gives the coupling coefficient k based on the system geometry as:

$$k = \sqrt{\frac{1}{\left(\frac{R_m}{R_{lk1}}+1\right)} \cdot \frac{1}{\left(\frac{R_m}{R_{lk2}}+1\right)}} \qquad \text{Equation (7)}$$

For a system with identical primary and secondary sides Equation (7) can be rewritten as:

$$k = \frac{1}{\left(\frac{R_m}{R_{lk1}}+1\right)} = \frac{1}{\left(\frac{R_m}{R_{lk2}}+1\right)} \qquad \text{Equation (8)}$$

Figure 4:
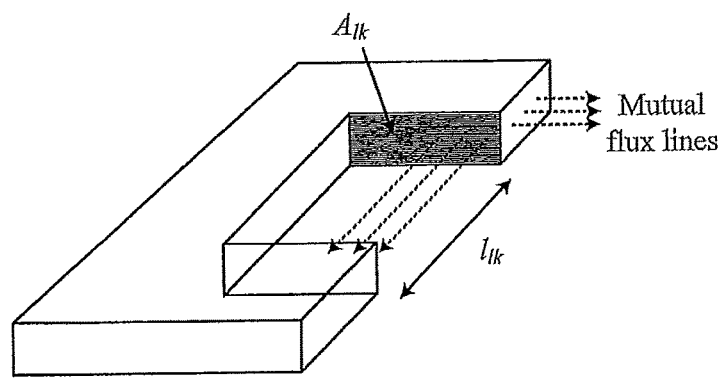
FIG. 4 shows the cross-sectional area and length of the leakage flux lines for the arrangement of FIG. 1.

The magnetic coupling coefficient of Equation (8) can be improved by reducing the ratios $\mathcal{R}_m/\mathcal{R}_{lk1}$ and $\mathcal{R}_m/\mathcal{R}_{lk2}$. Increasing the reluctance of the leakage flux path ($\mathcal{R}_{lk1}$ and $\mathcal{R}_{lk2}$) can be achieved by either increasing the length of the leakage flux path $l_{lk1}$ and $l_{lk2}$ (the distance between the core limbs) or reducing the leakage cross-section areas $A_{lk1}$ and $A_{lk2}$ (see FIG. 4). To improve the magnetic coupling coefficient within fixed structural dimensions, the distance between the core limbs ($l_{lk1}$ and $l_{lk2}$) is kept the same. Thus $\mathcal{R}_{lk1}$ and $l_{lk2}$ increase by reducing $A_{lk1}$ and $A_{lk2}$ (by reducing the length of the cores limbs as illustrated in the embodiments of FIGS. 5 and 6).

For the mutual reluctance $\mathcal{R}_m$ (the air gap reluctance) as the length of the limbs of the cores is reduced, the size of the air gap increases which results in greater reluctances and accordingly reduced mutual inductance. The mutual inductance is then improved by filling the available provided space (due to the shortened core limbs) with a greater number of turns.

Figure 5:
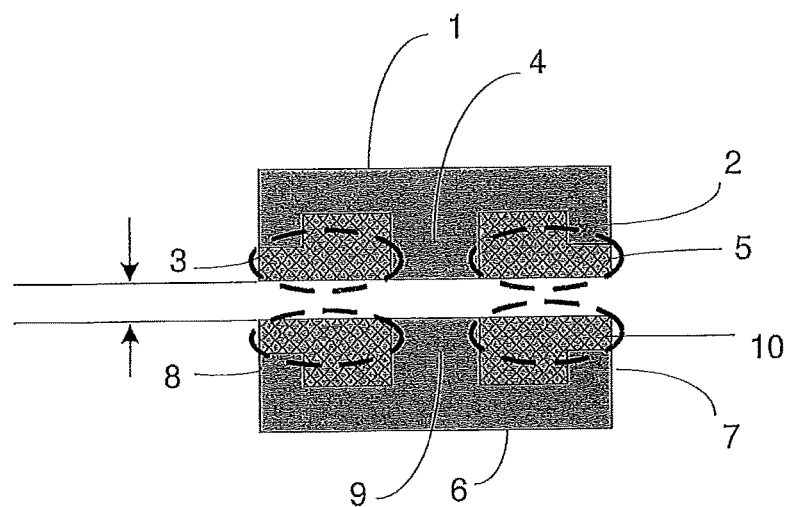
FIG. 5 shows the general configuration of an inductive power transfer coil arrangement according to one embodiment.
Figure 6:
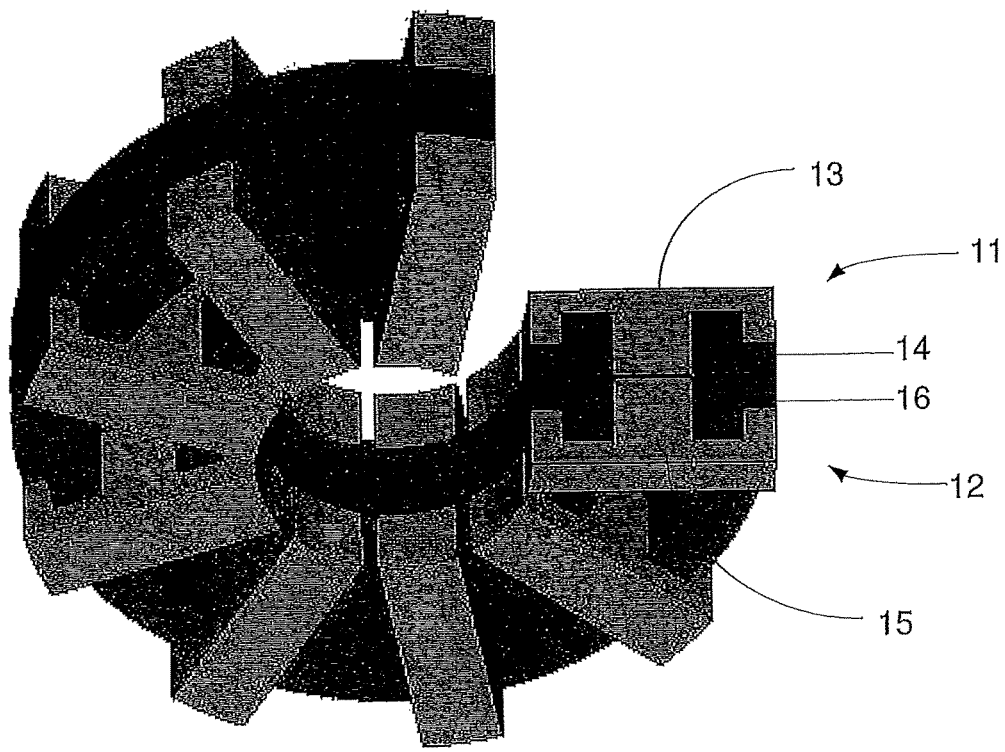
FIG. 6 shows a partially cut away slip ring type arrangement utilising the general configuration shown in FIG. 5.

FIG. 5 shows an exemplary configuration of an inductive power transfer coil arrangement utilizing the topology of the present invention. A first E core is formed by a base 1 and two outer limbs 2 and 3 and a central limb 4 extending from the base 1. Windings 5 are provide between the limbs and above the outer limbs 2 and 3 of the E core. A second E core is formed by a base 6 and two limbs 7 and 8 and a central limb 9 extending from the base 6. Windings 10 are provide between the limbs and above the limbs 7 and 8 of the second E core.

Counterintuitively this arrangement provides improved coupling due to:
1. increased M due to increasing $N_1$ and $N_2$ as stated in Equation (3), and
2. two loops of coils being provided on each side in proximity which enhances the flux linkage between the two sides as shown in FIG. 5. This results in the ratios $\mathcal{R}_m/\mathcal{R}_{lk}$ in Equation (8) being reduced and an increased coupling coefficient k.

FIG. 6 shows an exemplary slip ring embodiment utilising the topology of FIG. 5. In this embodiment the coil arrangement includes a first coil assembly 11 that is relatively rotatable with respect to a second coil assembly 12, as per a slip ring arrangement. In this embodiment the first coil assembly 11 includes a plurality of magnetically permeable cores 13 (only one of which is indicated) arranged along an annular path. A first coil 14 is wound following the annular path between central and outer limbs of each core 13 so as to form loops on either side of the central core. The second coil assembly 11 includes a plurality of magnetically permeable cores 15 (only one of which is indicated) arranged along an annular path. A second coil 16 is wound following the annular path between central and outer limbs of each core 15 so as to form loops on either side of the central core.

It will be appreciated that the plurality of cores 13 and 15 could each be replaced by a single core of annular form, although this form may be more expensive to produce. It will also be appreciated that this arrangement may also be implemented in linear form—either with a plurality of cores 13 and 15 in parallel linear arrangements or utilizing single opposed elongate cores. Further, it will be appreciated that rather than having the coil assemblies axially opposed they may be concentrically arranged with the limbs being generally radially directed. It will be appreciated that the design may be implemented with or without a through hole.

The coil arrangement of FIG. 6 was modelled using Litz wire, an air gap of about 5 mm between the first and second coil assemblies (considered a typical value) and the values specified in Table 1 below:

TABLE 1

| Parameter | Value |
| --- | --- |
| f (kHz) | 50 |
| $N_1 = N_2$ (Typical design) | 20 |
| $N_1 = N_2$ (Present embodiment) | 28 |
| Ferrite Mn—Zn with $B_s$ (T) | 0.5 |

Figure 7:
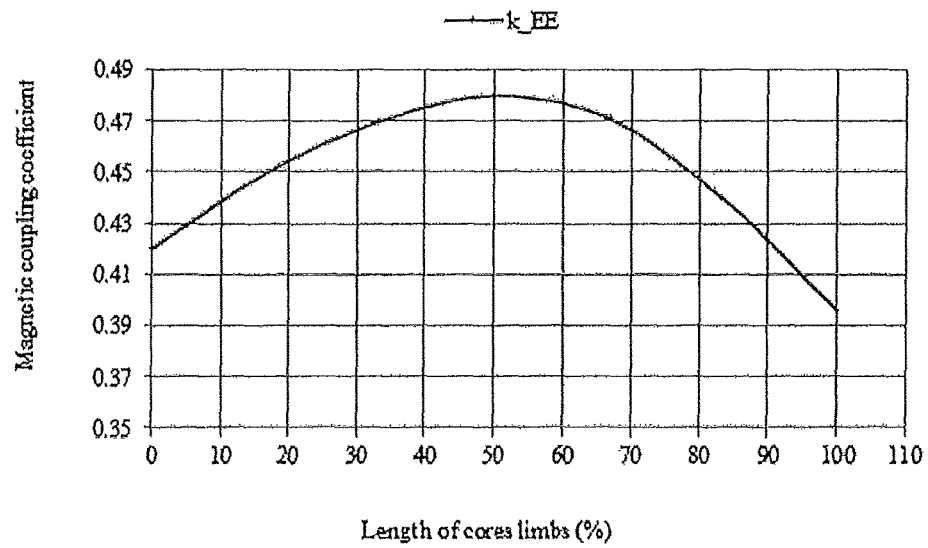
FIG. 7 shows the relationship between the magnetic coupling coefficient and the length of the ratio of the height of the outer limbs to the height of the central limb.
Figure 8:
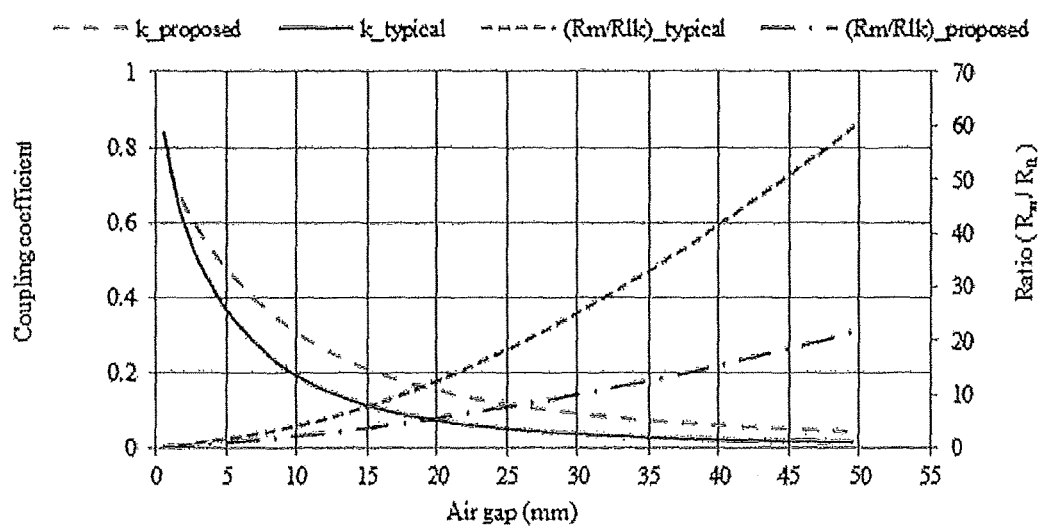
FIG. 8 shows the relationship between the magnetic coupling coefficient and the air gap.
Figure 9:
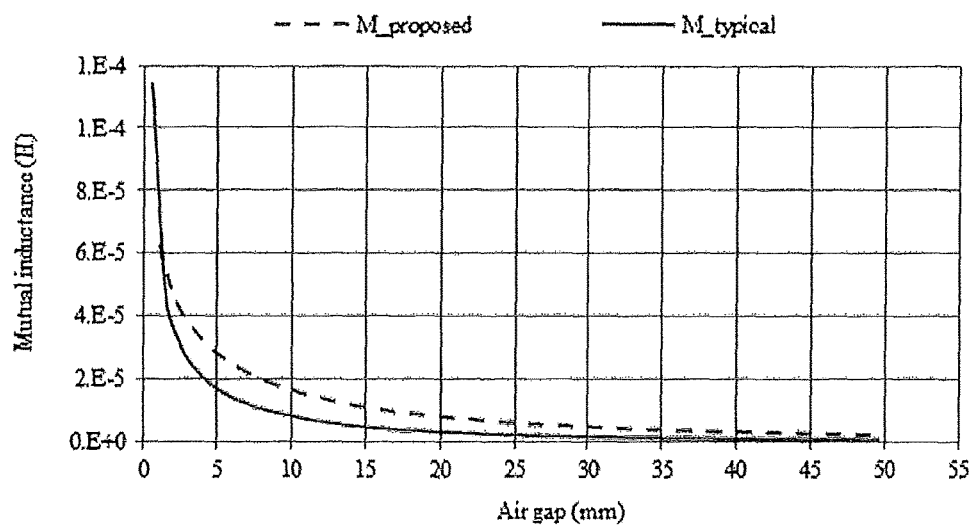
FIG. 9 shows the relationship between the mutual inductance and the air gap.

3D-FEM models were used to compare coil assemblies utilizing cores with outer limbs ranging in length from a core with no outer limbs (0%) to a core with outer limbs of the same length as the central limb (100%). The results shown in FIG. 7 show that the magnetic coupling coefficient changes non-linearly versus with the ratio of the length of the outer core limbs to the central core. The maximum magnetic coupling coefficient of about 0.48 is achieved when the length of the outer limbs is reduced to about 50% of the length of the central limb. As compared to a conventional design with full length outer limbs with a coupling coefficient k of about 0.4, the magnetic coupling coefficient is improved by about 20%. The graphs of FIG. 8 show the simulation results for a range of air gaps from about 0.5 mm to about 50 mm. As can be seen from FIG. 8, for the air gaps smaller than about 3 mm, the coupling coefficient of a conventional ("typical") design is greater than the coupling coefficient of the present embodiment ("proposed" design). After about 3 mm, the magnetic coupling coefficient of the present embodiment is greater for all the air gaps. This similarly happens for the mutual inductance between both sides as shown in FIG. 9. The maximum of about 45% improvement in magnetic coupling coefficient is achieved for an EE core topology with an air gap of about 9 mm.

As shown in FIG. 7 any value less than about 90% (i.e. outer limbs less than about 90% of the length of the central limb) is advantageous with values below about 80% being more advantageous. Ratios between about 20% and about 80% are seen to be particularly advantageous with values between about 40% and about 60% being most advantageous with a maximum at about 50%.

Figure 10:
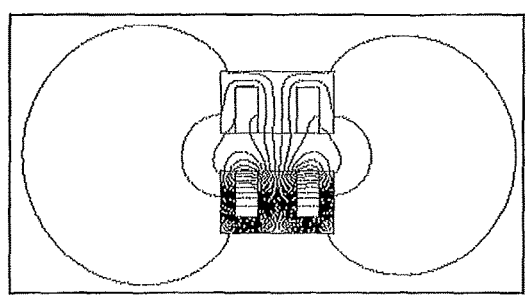
FIG. 10 shows magnetic flux lines for a conventional design.
Figure 11:
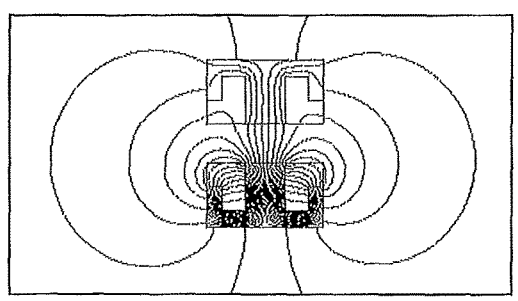
FIG. 11 shows magnetic flux lines for the embodiment shown in FIG. 5.

In FIG. 10 it can be seen that for a typical layout the flux lines tend to circulate between the core limbs for their low reluctance path which gets worse with increased air gap. As the core limbs are shortened as shown in FIG. 11 the cross-sectional area of the flux leakage reduces and accordingly the reluctances of the flux leakage path reduce. After reducing the leakage inductances due to short cores limbs, the mutual inductance then is improved by increasing the number of turns of both sides using the provided available space. Applying these two modifications together reduces $\mathcal{R}_m/\mathcal{R}_{lk}$ and enhances the coupling coefficient k as seen in FIG. 8.

The invention may find application in wide range of inductive power transfer applications including slip rings, linear arrangements such as are used for electric vehicles on roadways and automation, biomedical applications etc. Further, it is understood by those skilled in the art that the invention is applicable to IPT systems having materials other than air in the 'gap' between the transmitter and receiver coils.

The arrangements described provide improved magnetic coupling for a given physical size. This results in improved efficiency, a more compact construction and reduced cost.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power transfer coil arrangement comprising:
   i. a first coil assembly including:
      a. at least a first magnetically permeable core including a base having first and second limbs extending away therefrom, wherein the first limb is located between two of the second limbs and extends further from the base than the second limbs, and
      b. at least one coil wound about at least one of the limbs; and
   ii. a second coil assembly including:
      a. at least a second magnetically permeable core including a base having first and second limbs extending away therefrom, wherein the first limb is located between two second limbs and extends further from the base than the second limbs; and
      b. at least one coil wound about at least one of the limbs,
   the first and second magnetically permeable cores arranged to be relatively moveable wherein in some relative positions the first and second magnetically permeable cores are opposed such as to provide effective magnetic coupling.

2. An inductive power transfer coil arrangement as claimed in claim 1 wherein the first and second magnetically permeable cores are arranged along respective annular paths.

3. An inductive power transfer coil arrangement as claimed in claim 2 wherein the first and second coil assemblies each includes a plurality of cores.

4. An inductive power transfer coil arrangement as claimed in claim 1 wherein each of the first and/or second magnetically permeable cores is an annular core.

5. An inductive power transfer coil 4 arrangement as claimed in claim 1 wherein the first and second coil assemblies are axially opposed.

6. An inductive power transfer coil arrangement as claimed in claim 1 wherein the first and second coil assemblies are concentrically arranged.

7. An inductive power transfer coil arrangement as claimed in claim 2 having a through hole at the centre of the annular path.

8. An inductive power transfer coil arrangement as claimed in claim 1 wherein the second limbs are less than about 90% of the length of the first limb.

9. An inductive power transfer coil arrangement as claimed in claim 1 wherein the second limbs are less than about 80% of the length of the first limb.

10. An inductive power transfer coil arrangement as claimed in claim 1 wherein the second limbs are between about 20% and about 80% of the length of the first limb.

11. An inductive power transfer coil arrangement as claimed in claim 1 wherein the second limbs are between about 40% and about 60% of the length of the first limb.

12. An inductive power transfer coil arrangement as claimed in claim 1 wherein the second limbs are about 50% of the length of the first limb.

13. An inductive power transfer coil arrangement as claimed in claim 1 wherein the transition from the base to each limb is curved.

14. A magnetically permeable core for use in an inductive power transfer system, including a base having one or more first annular limbs and two or more second annular limbs extending away from the base, the one or more first annular limbs being located between the second annular limbs and extending further from the base than the second annular limbs, wherein the core is a unitary annular core.

15. A magnetically permeable core assembly for use in an inductive power transfer system, the assembly including a plurality of cores, each core including a base having one or more first limbs and two or more second limbs arranged along annular paths and extending away from the base, the one or more first limbs being located between the second limbs and extending further from the base than the second limbs, wherein the plurality of cores are arranged along an annular path.

16. A magnetically permeable core assembly as claimed in claim 15 including a winding wound following the annular path along which the plurality of cores are arranged.

* * * * *